United States Patent [19]
Johnson et al.

[11] Patent Number: 6,116,547
[45] Date of Patent: Sep. 12, 2000

[54] MODULAR TUBING SUPPORT AND CONSTRAINMENT DEVICE

[75] Inventors: Michael W. Johnson, St. Louis Park; Jeffrey J. McKenzie, Watertown, both of Minn.

[73] Assignee: Fluoroware, Inc., Chaska, Minn.

[21] Appl. No.: 09/249,126

[22] Filed: Feb. 12, 1999

Related U.S. Application Data

[63] Continuation-in-part of application No. 08/794,972, Feb. 5, 1997, Pat. No. 5,871,182.

[51] Int. Cl.$^7$ ........................................................ F16L 3/00
[52] U.S. Cl. .............................................. 248/49; 248/901
[58] Field of Search ............................. 248/49, 68.1, 53, 248/58, 901; 405/154

[56] References Cited

U.S. PATENT DOCUMENTS

| | | | |
|---|---|---|---|
| 2,002,103 | 5/1935 | Wheeler | 248/49 |
| 2,355,742 | 8/1944 | Morehouse | 248/68.1 |
| 3,042,351 | 7/1962 | Du Bois | 248/49 |
| 3,508,730 | 4/1970 | Knezo | 248/73 |
| 3,618,882 | 11/1971 | Podeworny | 248/68.1 |
| 3,787,016 | 1/1974 | Laval, Jr. | 248/49 |

FOREIGN PATENT DOCUMENTS

| | | | |
|---|---|---|---|
| 461974 | 12/1991 | European Pat. Off. . | |
| 723102 | 7/1996 | European Pat. Off. . | |
| 1339214 | 8/1963 | France | 248/49 |
| 2686141 | 7/1993 | France | 248/49 |
| 897951 | 7/1960 | United Kingdom . | |
| 2055441 | 3/1981 | United Kingdom . | |
| 2209632 | 5/1989 | United Kingdom . | |
| 2314216 | 12/1997 | United Kingdom . | |
| 89/02179 | 3/1989 | WIPO | 248/49 |

OTHER PUBLICATIONS

Cable Tray Systems, Airedale Sheet Metal Ltd, 1989, pp 2, 9, 11.
Chemins de Cables; echelles a Cables, Tolartois, 1988, pp 34, 39, 422, 57, Fig 10.
General Catalogue, Unex, 1993, pp 12, 15, 18.

*Primary Examiner*—Ramon O. Ramirez
*Attorney, Agent, or Firm*—Douglas J. Christensen

[57] ABSTRACT

A system and method for isolating the compressive and tensive forces created in a section of flexible tubing whose length expands and contracts in response to the fluid it conveys, while constraining the expansion of the tubing to a substantially horizontal plane. The tubing section having a pair of ends and a center portion therebetween. The system having a support structure and a pair of clamping members. The support structure having a pair of side constrainment portions for constraining the expansion of the tubing. The clamping members for anchoring the ends of the tubing section within the support structure thereby fixing their positions relative to each other and the support structure. When the tubing expands, the ends remain in their fixed position and the center portion of the tubing is forced to snake between the side constrainment portions.

17 Claims, 9 Drawing Sheets

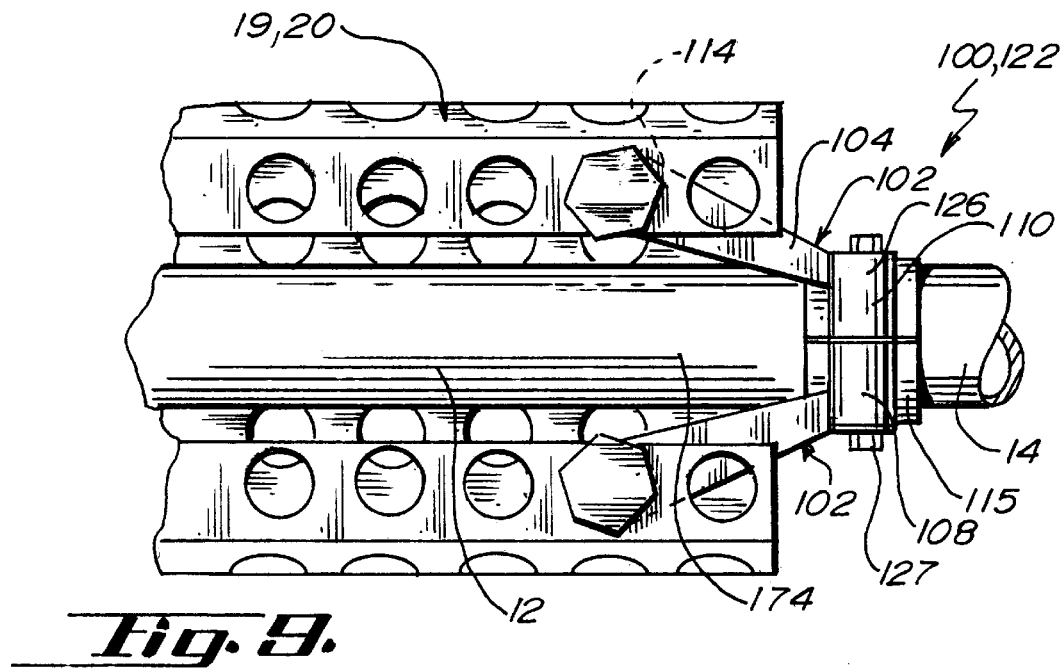
_Fig. 9._
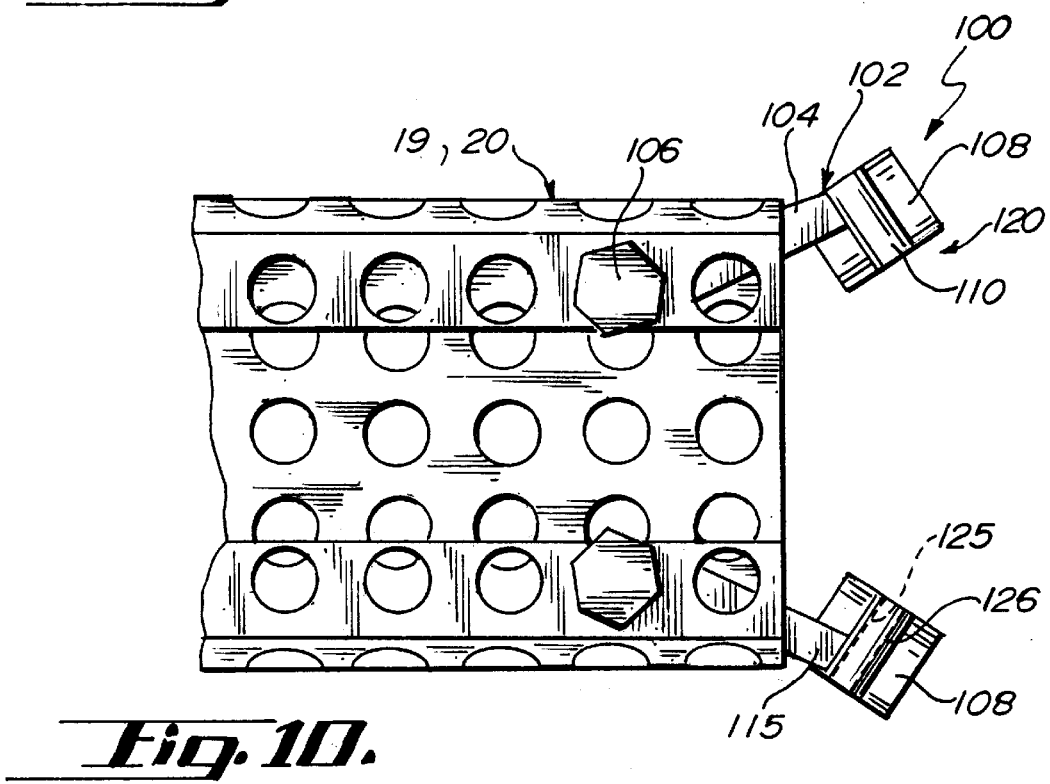
_Fig. 10._

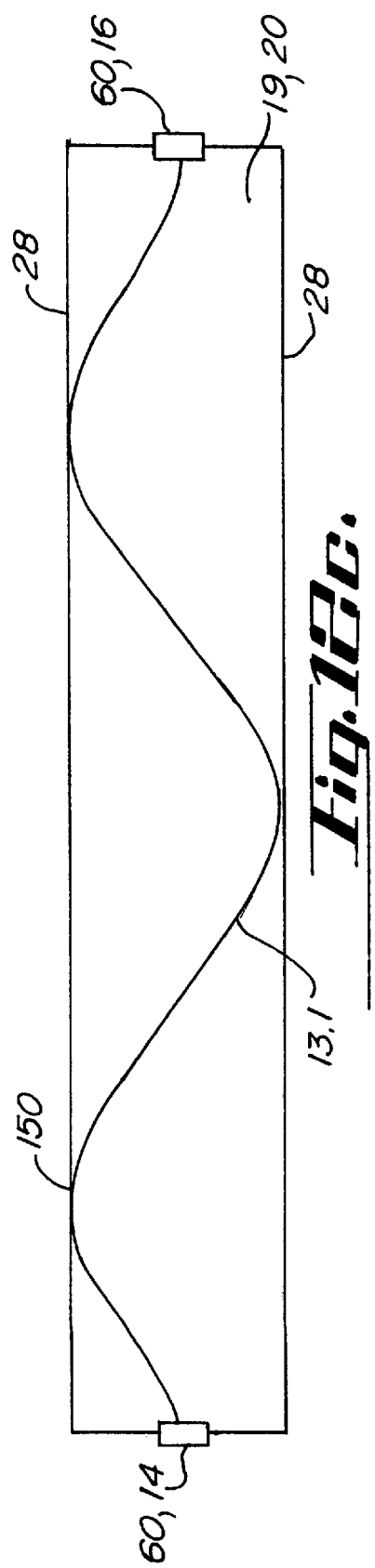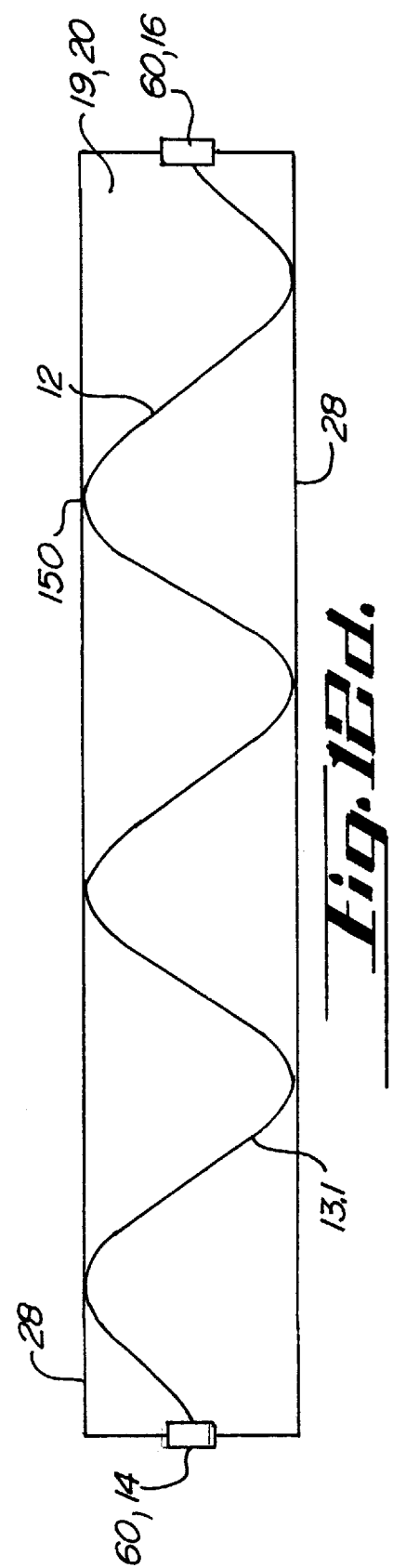

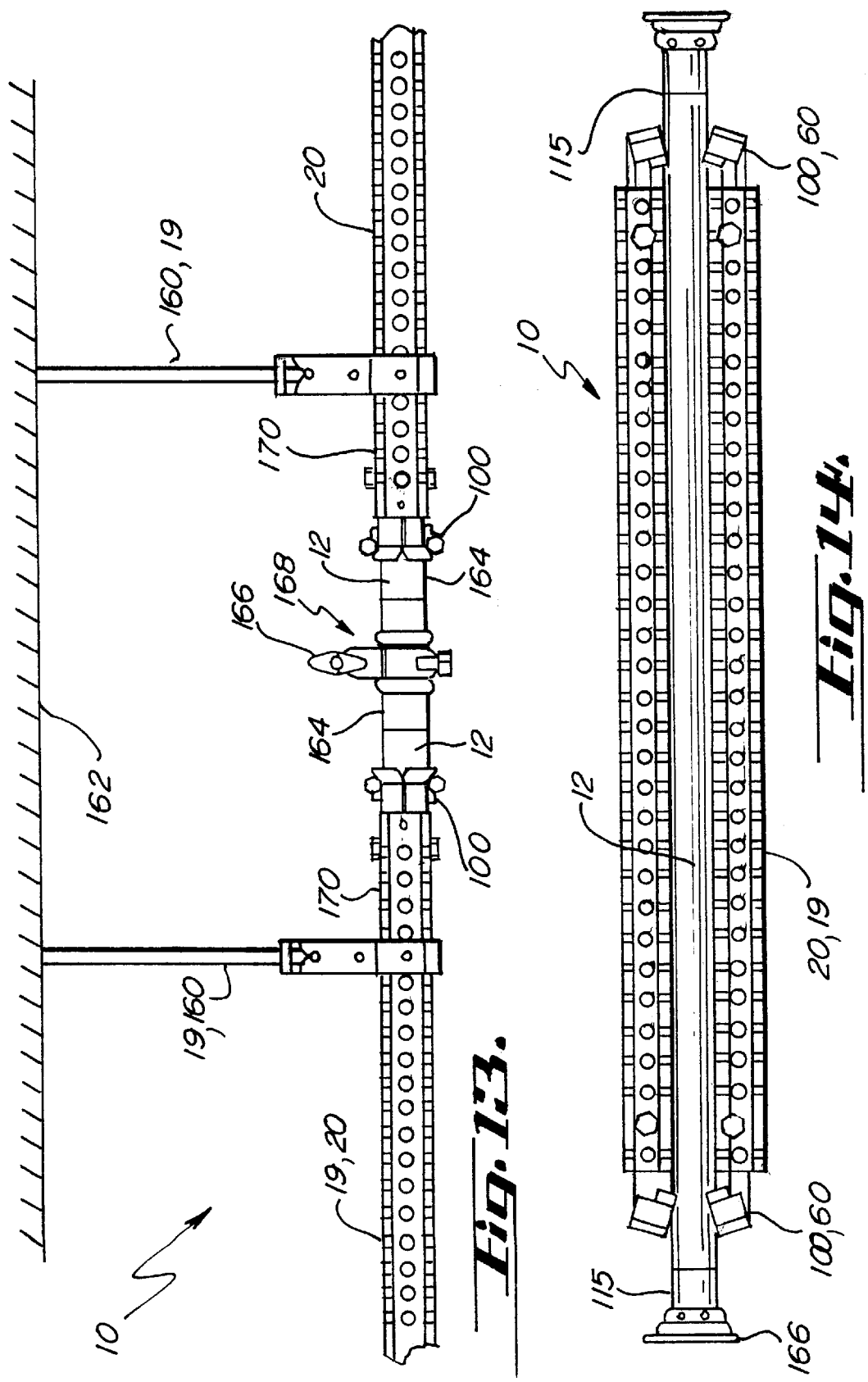

MODULAR TUBING SUPPORT AND CONSTRAINMENT DEVICE

BACKGROUND OF THE INVENTION

The subject application is a continuation-in-part of U.S. Ser. No. 08/794,972, filed Feb. 5, 1997 now U.S. Pat. No. 5,871,182.

The present invention relates to a system and method for isolating compressive and tensive forces which develop in a section of flexible tubing due to the length of the tubing section expanding and contracting in response to the temperature of the fluid it conveys. Additionally, the invention relates to the system and method for constraining the expansion of tubing to a substantially horizontal plane thereby maintaining the desired drainage properties of the tubing run.

A number of industries, such as the food processing and pharmaceutical industries, have traditionally used stainless steel tubing or piping for the transfer of fluid materials in various processes. In such processes the temperature of the fluid conveyed by the tubing may vary dramatically often in excess of 100 C. Particularly, in sanitary systems, cleaning of tubing systems is accomplished with steam. Moreover, in such processes the tubing lines are ideally positioned to allow free draining of the lines. That is, positioned at an incline without low undrainable collection areas. With stainless steel expansion and contraction of the tubing was minimal and could easily be accommodated by the tubing. Moreover, the rigidity and strength of stainless steel tubing allowed extended runs at an incline using intermittent supports without creating low hanging, non-drainable areas. Use of stainless has some problems including cost, difficulty in fabrication and susceptibility to corrosion in some sanitary applications.

Plastic tubing and fittings have become more prevalent in sanitary systems due to many advantages including cost, ease of assembly, and resistance to corrosion. However, plastic tubing is substantially more flexible than stainless steel and is much more susceptible to expansion and contraction due to temperature changes. A ten-foot length of plastic tubing can increase in length by more than an inch which is approximately one hundred times greater than stainless steel. Tubing that has been pulled taught during installation will expand and contract and can cause extreme stress on the tube fittings eventually causing them to fail. In addition, the expansion of the tubing will create high and low regions within the tubing resulting in poor drainage properties.

As a solution to these problems, various installations now incorporate large amounts of slack, e.g. u-shaped sections of tubing to accommodate the changes in tubing length due to temperature changes. Tubing that has been installed with a certain amount of slack to reduce the stress on the fittings will also experience the expansion as well as snaking. As a result, even when additional slack has been added in the tubing run, the expansion and contraction of the tubing can still cause extreme stress on the tube fittings creating a potential for failure and can adversely affect the drainage properties of the tubing run. New problems are also introduced. First, the additional tubing requires additional support structure and occupies space that could have been used for other tubing runs. Furthermore, in order to accommodate the inherent flexibility or lack of rigidity of the tubing, long runs of tubing either need a radical incline or must incorporate numerous tubing supports in order to avoid drainage problems. Second, numerous u-shaped sections will cause pressure losses throughout the length of the line which may create problems for the equipment the tubing is feeding. Finally, the additional amount of tubing and support structure results in higher costs. As a result, these methods are unable to significantly negate the problems associated with the expansion and contraction of flexible tubing runs.

Sanitary tubing, piping, hoses, and associated connectors used in the food processing and pharmaceutical industries must meet sanitary requirements such as those set forth in the United States Code of Federal Regulations, 7 C.F.R. §58.128. The standards provide that the conduit be smooth, permit laminar flow of fluids and be free of discontinuities that could trap particulate matter. The fluid path must also be free of crevices that could give rise to capillary action that might allow the fluid being transported to accumulate and possibly putrefy. The addition of u-shaped tubing sections only multiplies the possibility of unwanted discontinuities and crevices.

In light of the above, there is a need for a system or method capable of isolating the compressive and tensive forces created in tubing runs from the fittings while constraining the expansion of the tubing such that the desired drainage properties of the tubing run are not adversely affected.

SUMMARY OF THE INVENTION

A system and method isolates the compressive and tensive forces created in a section of flexible tubing whose length expands and contracts in response to the fluid it conveys, the system and method further constrains the expansion of the tubing to a substantially horizontal plane. The tubing section generally comprising a pair of ends and a center portion therebetween. One embodiment of the system generally comprises a support structure having a pair of side constrainment portions and a pair of clamping members. The clamping members anchor the ends of the tubing section within the support structure thereby fixing their positions relative to each other and the support structure. When the tubing expands, the ends remain in their fixed position and the center portion is forced to snake between the side constrainment portions in a horizontal plane thus facilitating drainage.

A feature and advantage of an embodiment of the invention is that the tensive and compressive forces that develop within a tubing section are isolated from the fittings or equipment they connect to.

Another feature and advantage of an embodiment of the invention is that the necessity of incorporating u-shaped tubing sections into the tubing runs is eliminated. Further, the problems associated with the u-shaped tubing runs, i.e. additional tubing expense, additional space requirements, pressure losses, and draining problems, have been eliminated.

Another feature and advantage of an embodiment of the invention is that the support structure controls the snaking of the tubing when it expands and maintains the tubing in a substantially horizontal plane to prevent drainage problems.

Yet another feature and advantage of an embodiment of the invention is that the support structure incorporates apertures to facilitate connecting additional support structure, attaching the clamping members, viewing of the tubing, and draining the support structure.

Still yet another feature and advantage of an embodiment of the invention is that the clamping members allow for the tubing section to be easily inserted and removed from the support structure.

Another feature and advantage of an embodiment of the invention is that the clamping members have a tubing engagement portions which grip the tubing and allow the clamping member to counteract the tensive and compressive forces on the end of the tubing section being anchored in place.

Yet another feature and advantage of an embodiment of the invention is that tubing junctions are isolated from the tensive and compressive forces which develop in the tubing sections being joined.

DESCRIPTION OF THE DRAWINGS

These and other features, aspects and advantages of the present invention will become better understood with regard to the following descriptions, appended claims, and accompanying drawings, where:

FIG. 4 is a front elevation of the present invention showing in detail the configuration of the clamping member;

FIG. 9 is a top plan view of an embodiment of the invention depicting the clamping member in its closed position;

FIG. 10 is a top plan view of an embodiment of the invention depicting the clamping member in its open position;

FIGS. 12(a)–(d) are top plan views of a section of flexible tubing snaking in the support structure.

FIG. 13 is a side plan view of an embodiment of the invention;

FIG. 14 is a top plan view of an embodiment of the invention;

DETAILED DESCRIPTION

Figure 1:
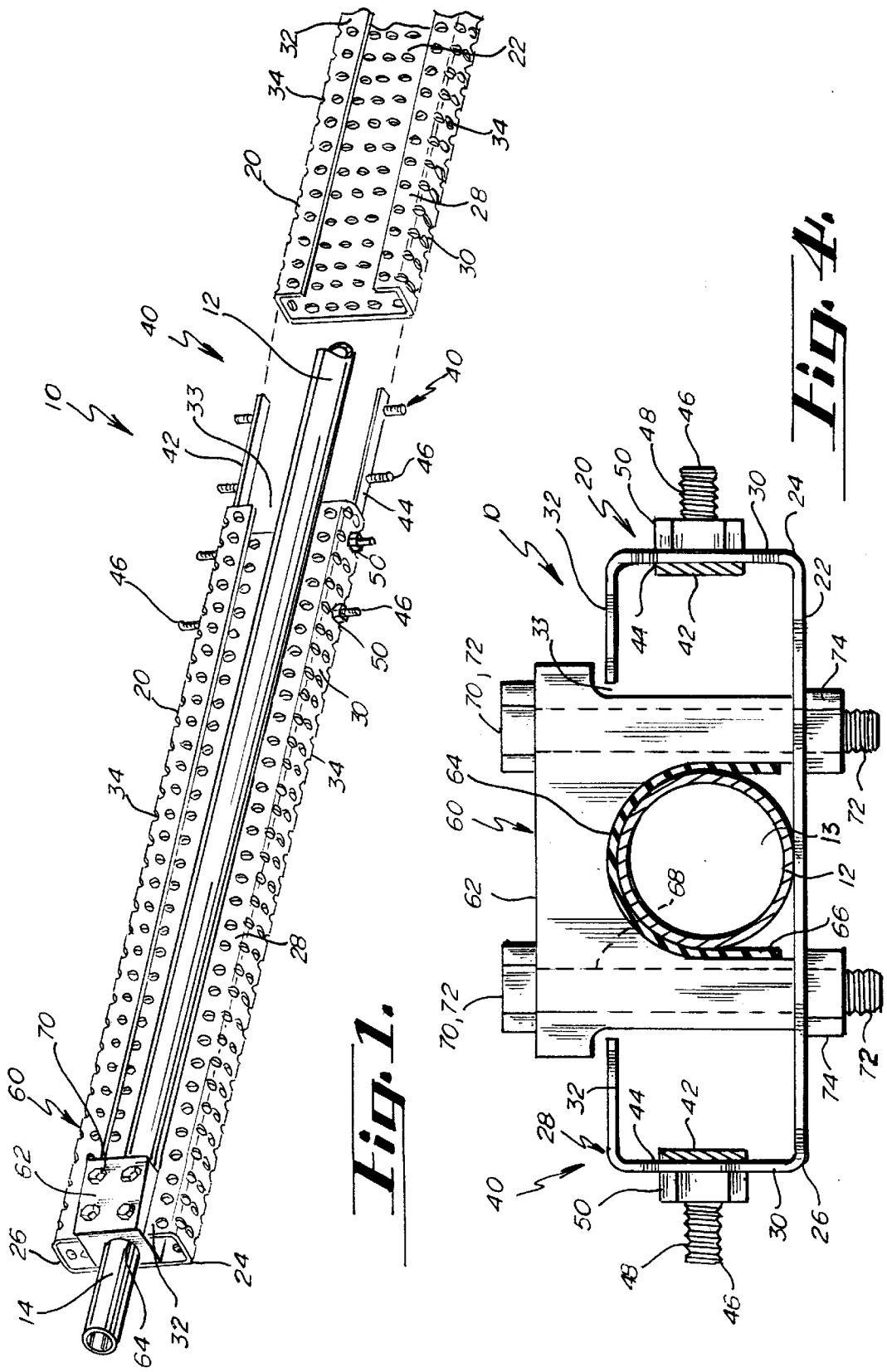
FIG. 1 is a perspective view of the present invention showing how two modular support tray sections may be joined with a straight module connector portion.

A modular tubing support and constrainment device or system, designated as 10, for supporting and constraining flexible tubing 12 and isolating the tensive and compressive forces which develop within flexible tubing 12 is shown in FIGS. 1, 2, 9, and 13.

The flexible tubing 12, generally made of plastic, has a fluid flow concourse 13 for conveying fluid of varying temperature, a center portion 13.1, first and second ends 14 and 16, and a length that expands and contracts in response to the fluid temperature. Typically, the fluid temperature will range from 70°–300° F. The coefficient of thermal expansion for most plastic tubing is approximately: $7.6 * 10^{-5}$ in./in./degree F. from 70°–212° F.; $9.2 *10^{-5}$ in./in./degree F. from 212°–300° F.; and $11.5 * 10^{-5}$ in./in./degree F. from 300°–408° F. Using these figures, a ten foot section of plastic tubing increasing in temperature from 70° F. to 300° 0 F. will expand almost 2.3 inches. As a result, a tubing run of 100 feet undergoing a similar temperature change will expand more than 2 feet. Similarly, flexible tubing 12 will contract with cooling temperatures. The result of this expansion and contraction is the development of compressive and tensive loads, respectively. These loads can cause damage to fittings and other equipment to which flexible tubing 12 connects. Furthermore the expansion of tubing 12 will cause drainage problems if not properly constrained. The purpose of system 12 is to isolate the fittings and equipment from the tensive and compressive forces and constrain tubing 12 such that it is forced to expand within a substantially horizontal plane to prevent drainage problems.

There are two main embodiments of system 10. One embodiment of system 10, generally shown in FIGS. 1, 2 and 14, comprises support structure 19 and clamping members 60. Support structure 19 serves the purposes of supporting tubing 12 and constraining its expansion. Clamping members 60 attach to support structure 19 and anchor first and second ends 14 and 16, thereby fixing their relative positions and forcing center portion 13.1 to move laterally within support structure 19. Clamping members 60 also counteract the compressive and tensive forces which develop in flexible tubing 12 when it expands and contracts.

In a second embodiment of the invention, system 10 isolates a component, such as a fitting or equipment, from the varying tensive and compressive loads contained within the flexible tubing 12 to which it connects. This second embodiment of system 10, generally shown in FIGS. 9, 13 and 16, comprises support structure 19 and at least one clamping member 60. Clamping member 60 attaches to support structure 19 and anchors end 14 of tubing 12 such that end 14 is isolated from the tensive and compressive loads contained within tubing 12. As a result, when a component attaches to end 14 of tubing 12, it is isolated from the tensive and compressive loads.

In the first embodiment of system 10, support structure 19 is configured as a modular support tray 20 comprising a bottom planar portion 22 that is the support means for the flexible tubing 12. The bottom planar portion 22 has a first side 24 and a second side 26. Engaged with each side 24, 26 is a side constrainment portion 28. Each side constrainment portion 28 is comprised of a side planar portion 30 that is preferably integral with the sides 24, 26 of the bottom portion 22 and a top planar portion 32 that is preferably integral with the side planar portion 30. The side constrainment portion 28 extends up and around to create an open top channel 33, the width of the open top channel equivalent to the spacing between the two top planar portions 32. The top planar portions 32 should be spaced far enough apart to fully accommodate the diameter of tubing 12 and its foreseeable expansion.

Figure 12A:
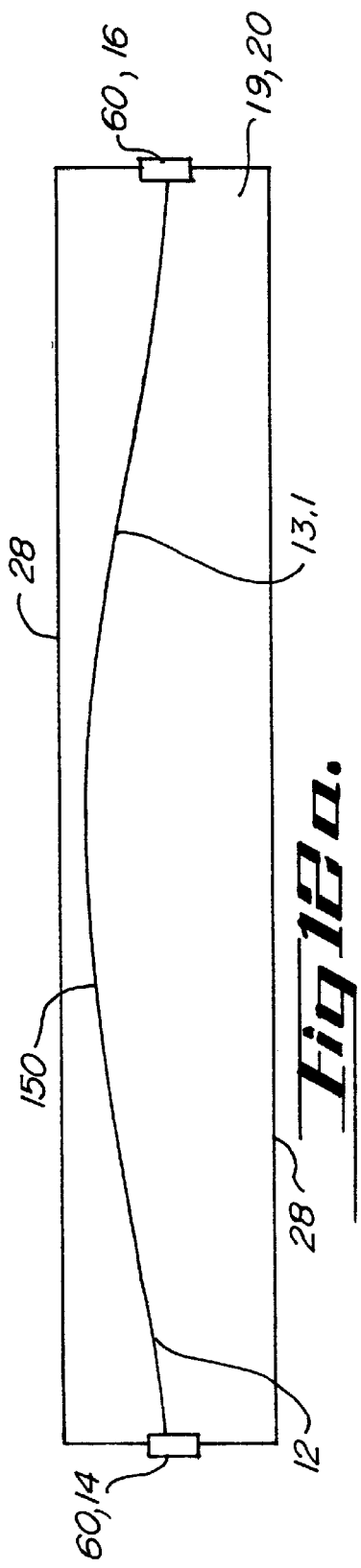
Figure 12B:
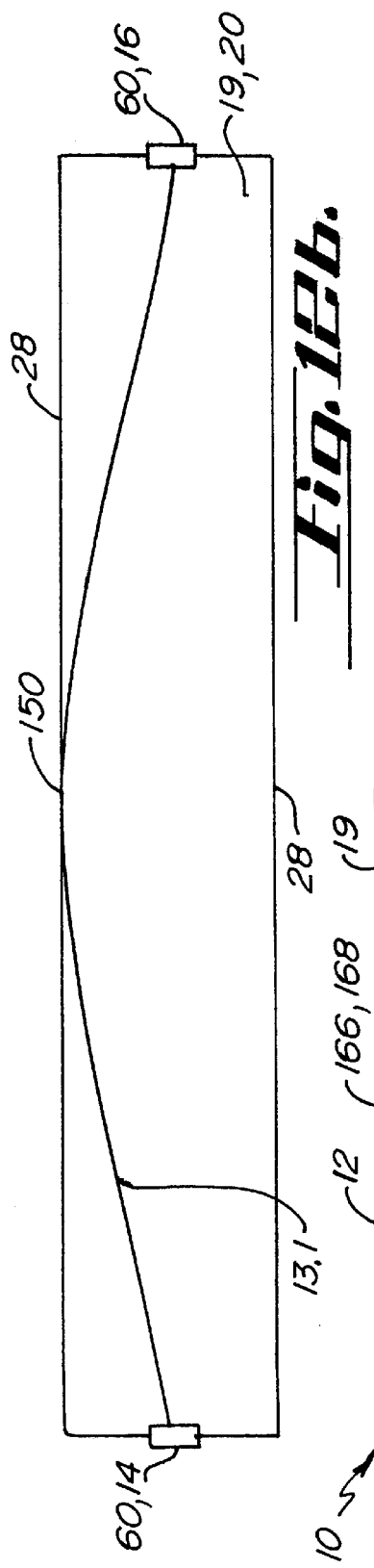

FIGS. 12(a)–(d) show the center portion 13.1 of tubing 12 contained within the modular support tray 20 with ends 14, 16 anchored in place by the clamping members 60. Only the basic outline of the tray 20 is shown. As the tubing length expands in the modular support tray 20, the tubing 12 begins to snake. FIG. 12(a) shows the tubing 12 at the initial expansion stage forming a single node 150 within the support tray 20. Eventually, as the tubing length continues to expand, the center portion 13.1 will proceed to move laterally until it abuts one of the side constraint portions 28 thereby preventing further lateral movement as depicted in FIG. 12(b). Subsequent expansion of the tubing length forces the center portion 13.1 to form additional nodes 150 as necessary. This nodal expansion or snaking is shown in FIGS. 12(c) and (d).

The bottom planar portion 22, the side planar portion 30 and the top planar portion 32 of the modular support tray 20 are of a uniformly narrow thickness. The height of the modular support tray 20 is defined by the height of the side planar portion 30 and by whatever additional height is added by the thickness of the top planar portion 32. Preferably, this height should be slightly greater than the diameter of the flexible tubing 12. As the tubing snakes within modular support tray 20, it is maintained in a substantially horizontal plane by the bottom planar portion 22 and the top planar portions 32.

The modular support tray 20 is preferably made of stainless steel to withstand corrosive environments. Should the desired environment be non-corrosive, other types metals, plastics, resins, and/or polymers might be used. The modular support tray 20 may be manufactured in virtually any length, width and thickness of material, selection of these variables dependent upon the environment, the space available and the length, diameter and weight of the fluid filled tubing 12. The modular support tray 20 further incorporates a plurality of apertures 34. These apertures 34 are equally sized and are equidistantly spaced along the full length, height and width of the modular support tray 20. These apertures 34 will not only function as a module connector engagement means but will have a number of other uses as will be described below.

Figure 2:
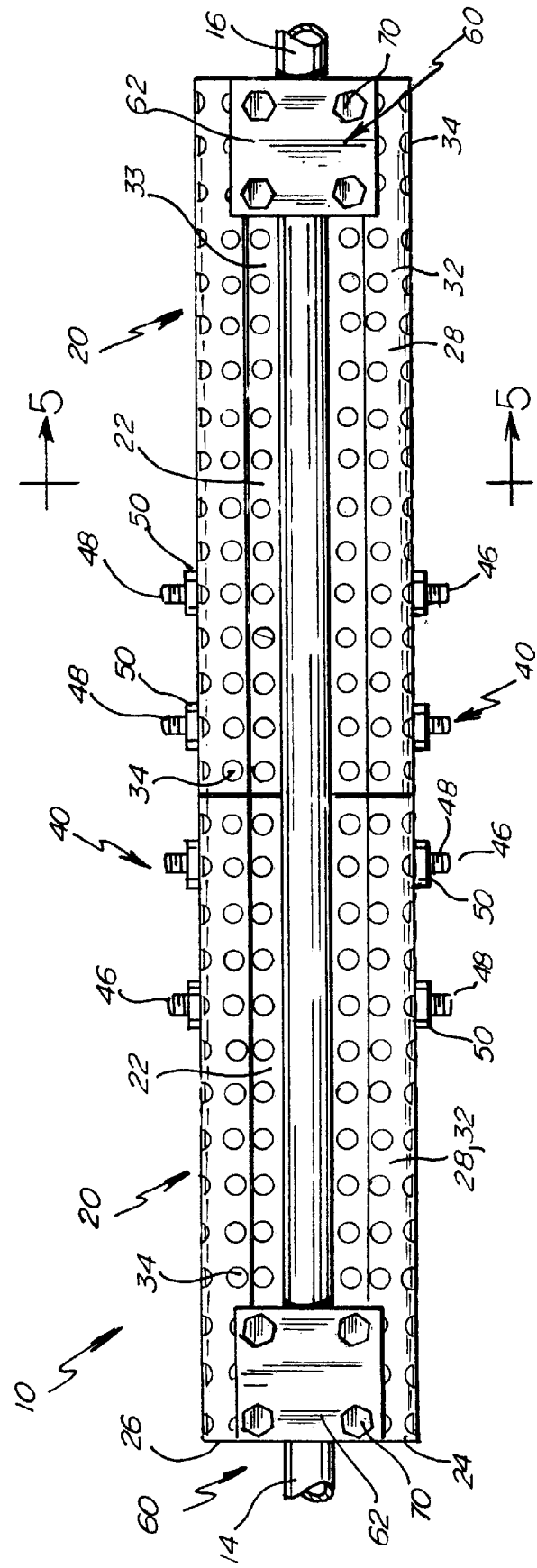
FIG. 2 is top plan view of the present invention depicting two connected modular support trays and clamping members at the first and second ends of the tubing.
Figure 3A:
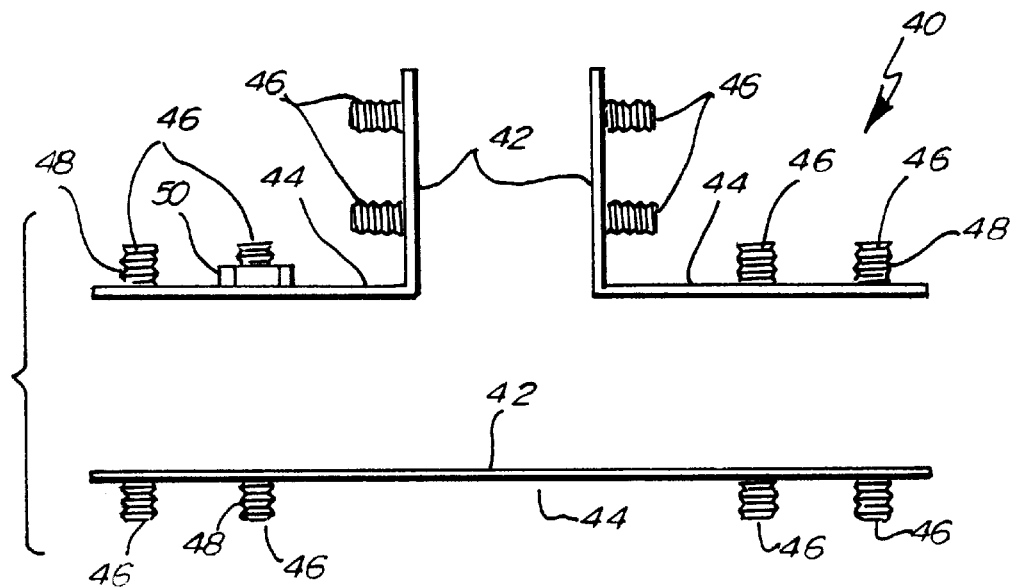
FIG. 3A is a top plan view of a set of tee configuration module connector portions.
Figure 3B:
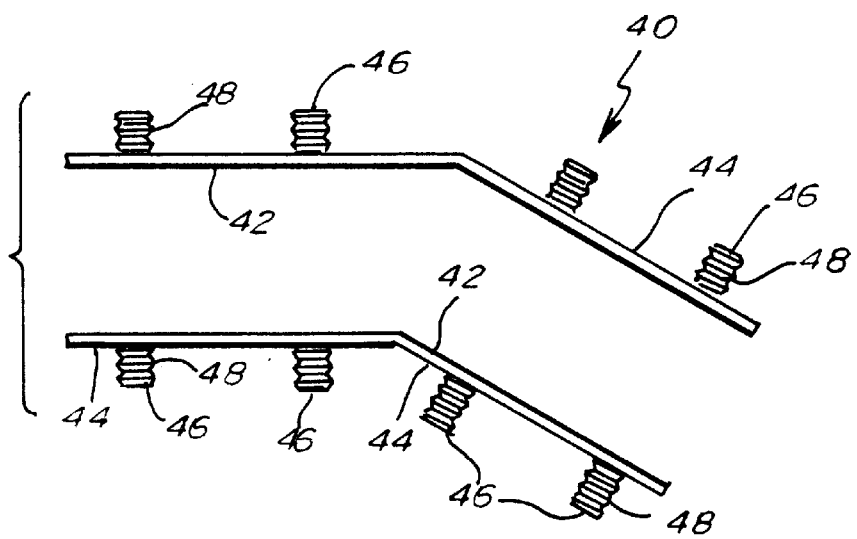
FIG. 3B is a perspective view of a set of elbow configuration module connector portions.
Figure 5:
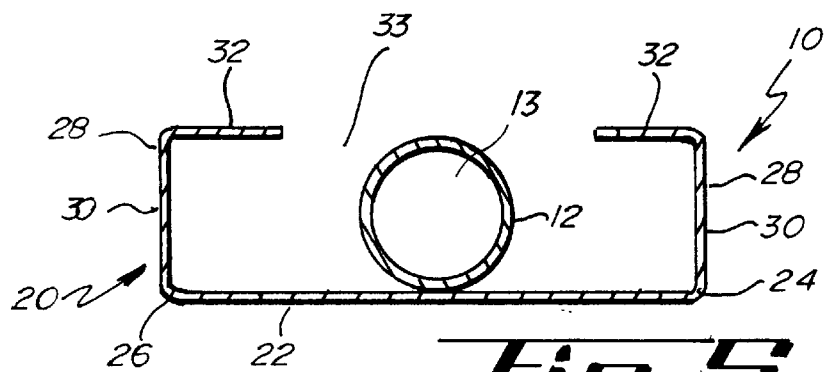
FIG. 5 is a sectional view of the present invention taken along line 5—5 of FIG. 2.

The module connector portion 40 or module connector means, an additional form of support structure 19, comprises a planar rear face 42 that faces into the open top channel 33, a planar front face 44 and a plurality of extending connectors 46. The connectors 46 are preferably integral with the front face 44 extending outward therefrom. The connectors 46 are inserted through the apertures 34 of the modular support trays 20 until the front face 44 is proximate the side planar portion 30 of the side constrainment portion 28. Some of the connectors 46 are inserted through apertures 34 in a first modular support tray 20 while the remainder of the connectors 46 are inserted through the apertures 34 of a second modular support tray 20 so as to join and connect the modular support trays 20 into a single continuous unit, as shown in FIG. 2. Note that the module connector portions 40 may take a number of configurations such as straight, elbow or tee configurations, as shown in FIGS. 3A and 3B. The connectors 46 preferably incorporate threads 48 or a threaded portion such that a nut 50 may be threaded onto the connector 46 to secure the module connector portion 40 to the modular support tray 20. The module connector portion 40 is also suitably made of a stainless steel to withstand a corrosive environment however, other types of metals, plastics, resins, and/or polymers may be used for non-corrosive environments.

Figure 6:
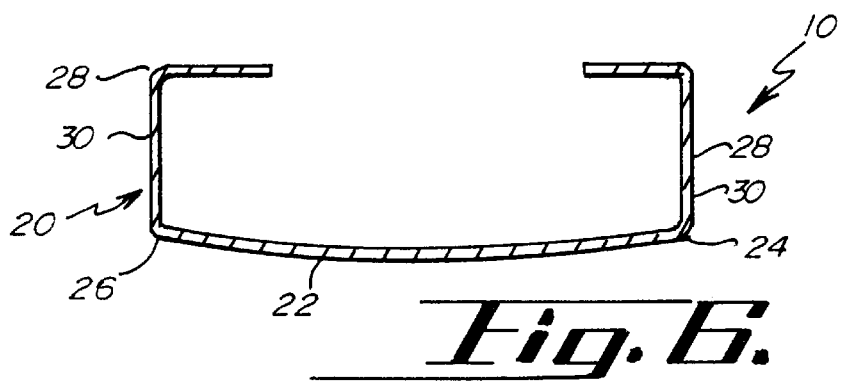
FIG. 6 is a front elevation of an embodiment of the present invention.

An alternative embodiment to the support tray 20 is shown in FIG. 6. In this embodiment, the bottom portion 22 of the modular support tray 20 is not planar but rather curvilinear in shape. Depending on the user's application numerous other bottom portion shapes may be appropriate as well. For example, the bottom portion 22 may be shaped as a rounded wave pattern across the width of the bottom portion 22, a pointed wave pattern across the width of the bottom portion 22, a recessed trough provided in the bottom portion 22, and other shapes.

Figure 7:
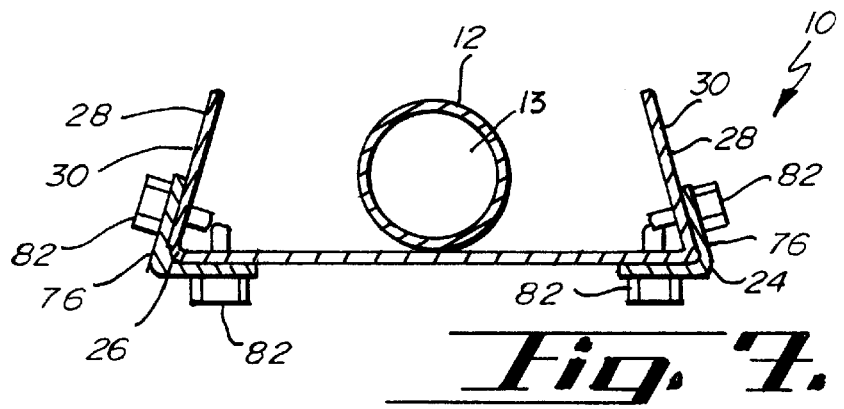
FIG. 7 is a front elevation of an embodiment of the invention.
Figure 8:
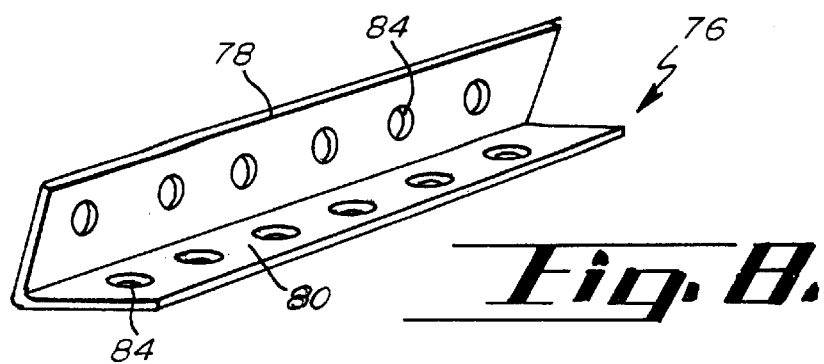
FIG. 8 is a perspective view of the clamping bar used in FIG. 7.

Yet another alternative embodiment of support tray 20 is disclosed in FIG. 7. Here, the side constrainment portions 28 are not integral with the bottom portion 22. Rather, the side constrainment portions 28 are connected to the bottom portion through use of a clamping bar 76 shown in FIG. 8. The clamping bar 76 has a side face 78 and a bottom face 80, the side face 78 attached to the side constrainment portion 28 and the bottom face 80 attached to the bottom portion 22 with an attachment device 82, such as a bolt/nut or screw/nut combination, that is inserted through an aperture 84 in the clamping bar and an aligned aperture 34 in the modular support tray 20. The clamping bar 76, as shown in FIGS. 7 and 8, has an angled configuration that also causes the attached side constrainment portions 28 to be at an angle to the bottom portion 22. This variation, wherein the side constrainment portions 28 are at an angle (acute or obtuse) to the bottom portion 22, may be used in any embodiment or configuration whether or not the side constrainment portion 28 is integral or non-integral with the bottom portion 22.

The first embodiment of clamping member 60, or clamping means, of the modular tubing support and constrainment device 10, is in the configuration of a clamping block 62, see FIGS. 1, 2 and 4. The clamping block 62, made of a solid, rigid material such as stainless steel, other metals, plastics, resins or polymers (stainless steel may be a necessity in corrosive environments), has an arcuate bore 64 therethrough. The clamping block 62 is sized to fit within the open top channel 33 while the arcuate bore 64 is sized to fit snugly about the outer diameter of the flexible tubing 12. To enhance the gripping and/or constraining ability of the clamping block 62 about the tubing 12, the arcuate bore 64 may be lined with an elastomeric material 66 or elastomeric lining means. To secure the clamping block 62 to the modular support tray 20, the clamping block 62 integrates a plurality of holes 68 for accepting clamping devices 70. The clamping devices 70 are preferably the combination of bolts 72 and nuts 74. The bolts 72 are inserted through the holes 68 and further through the apertures 34 located on the bottom portion 22 of the modular support tray 20 where they are secured to the modular support tray 20 by use of the nut 74 threaded tightly onto the bolt 72. The clamping member 60 helps to relieve the stress that is placed on the tube fittings by the expansion and snaking of the tubing 12. In this manner, the stress caused by the snaking is virtually stopped at the clamping block 62 by the solid and rigid structure of the block 62. Further, the solidness and rigidity of the clamping block 62 serves to constrain or minimize the expansion of the tubing 12 at the block 62 acting as a safety protect for the tube fittings or other components.

A second embodiment of the clamping member 60, or clamping means, is the clamping member 100 shown in FIGS. 9–11, 14 and 15. Clamping member 100 comprises clamping portions 102, made of a solid, rigid material such as stainless steel or other metals, plastics, resins or polymers. Each clamping portion 102 having an arm 104, a tubing engagement portion 108, and clamp locking portions 110.

Figure 11:
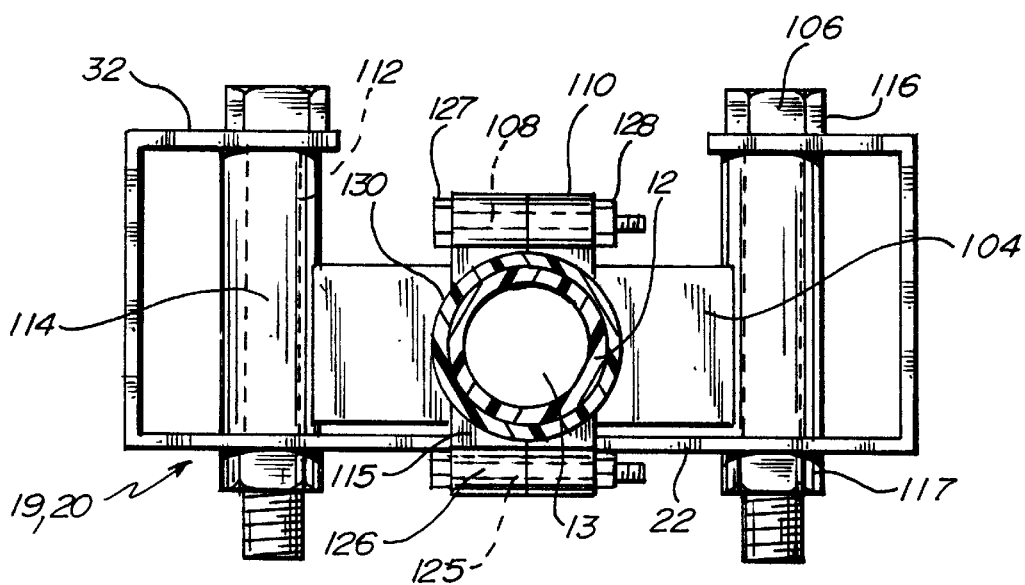
FIG. 11 is a front plan view of an embodiment of the invention.

The arms 104 are designed to fit within the modular tray 20 between the bottom planar portion 22 and the top planar portion 32 as shown in FIG. 11. Each of the arms 104 have a tray end 114 and a tube end 115. An axial bore 112 is located at the tray end 114. Tray connectors 106 connect tray ends 114 of arms 104 to the modular tray 20. The tray connectors 106 are preferably the combination of nuts 116 and bolts 117 which provide rotatable attachment of the tray ends 114 of the arms 104 to the modular tray 20, thereby allowing arms 104 to swing between an open position 120 as shown in FIG. 10 and a closed position 122 as shown in FIGS. 9 and 11. When the clamping member is in the open position 120, tubing sections 12 may be easily inserted and removed.

The tubing engagement portions 108 are shaped to conform with the outer diameter of the flexible tubing 12 as shown in FIG. 11. In a preferred embodiment, the tubing engagement portions may include an elastomeric lining 130 for improved gripping capability and for protecting the outer surface of tubing 12.

Figure 15:
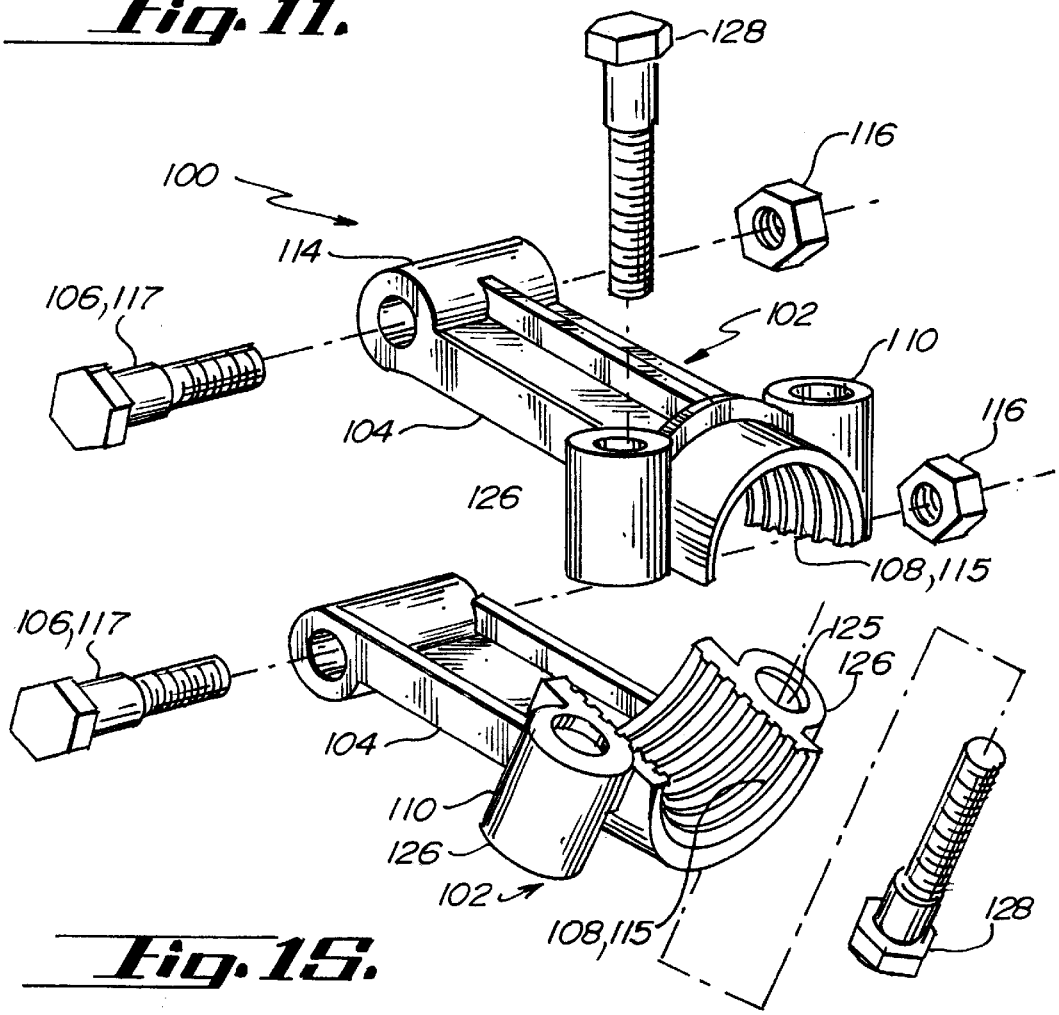
FIG. 15 is an exploded perspective view of a clamping member according to an embodiment of the invention.

The clamp locking portions 110, shown in FIGS. 9, 11, and 15 secure the tubing engagement portions 108 together in the closed position 122, thereby anchoring tubing 12. Clamp locking portions 110 incorporate connector portions 126 having bores 125, the connector portions integral with the tube end 115 of arms 104. Preferably, corresponding connector portions 126 are attached to each other with nuts 127 and bolts 128. Bore 125 may be threaded to eliminate the need for nuts 127. Other configurations for clamp locking portions 110 are common hoop, hook and lever mechanisms which simplify the connection of the tubing engagement portions 108 by eliminating the need to use nuts and bolts. Many other suitable latching mechanisms could be substituted for the clamp locking portions 110 described herein.

In one preferred embodiment of system 10, clamping member 100 anchors the end 115 of tubing 12 outside of support structure 19 as shown in FIG. 14. This configuration allows for easy installation and removal of the tubing 12 due to the exposure of the clamping member 100.

Referring now to FIGS. 13 and 9, an aspect of the second embodiment of system 10 is shown. Here, support structure 19 consists of two support trays 20 and ceiling support members 160, which are used to suspend support tray 20 from the ceiling 162 and generally fix the position of support trays 20. Additionally, the ceiling 162 could be considered part of support structure 19. In this embodiment, two sections of tubing 12, each having a junction end 164, are joined at the junction ends 164 by a fitting 166 thereby forming a tubing junction 168. Clamping members 60, shown as clamping members 100, anchor the junction ends 164 of tubing 12 with respect to support structure 19. As a result, the tubing junction 168 is isolated from the tensive and compressive loads contained within tubing 12 on the non-junction sides 170 of the clamping members 100.

Figure 16:
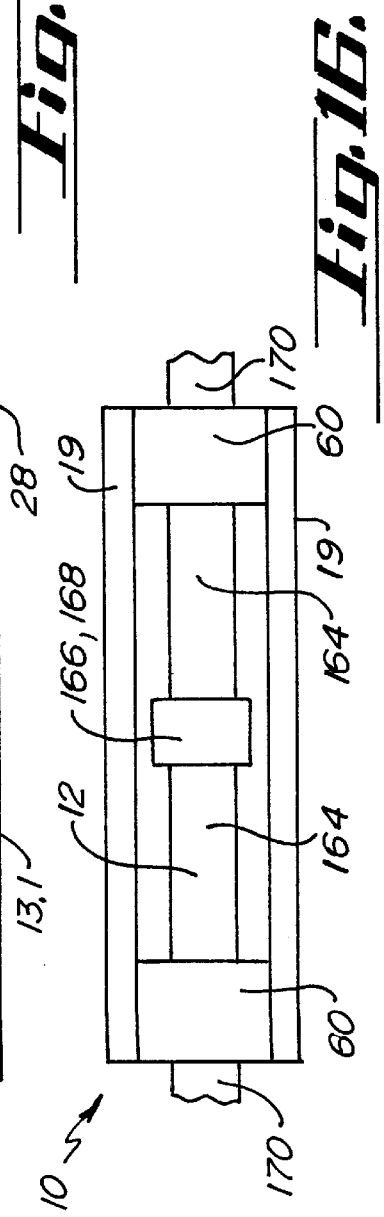
FIG. 16 is a side plan view of an embodiment of the invention.

FIG. 16 shows another embodiment of system 10 capable of isolating the tubing junction 168 from the forces contained within two tubing sections 12 on the non-junction side 170 of clamping members 60. In this embodiment, support structure 19 spans the tubing junction 168 and rigidly connects clamping members 60 together, thereby fixing the relative positions of clamping members 60. Here, the clamping members 60 could take the form of clamping members 62 or clamping members 100. Furthermore, since clamping members 60 anchor the junction ends 164 of the tubing sections 12 to the support structure 19, the junction ends 164 are held in fixed relation to each other. As a result, the tubing junction 168 and the fitting 166 are isolated from the loads contained within tubing sections 12 on the non-junction side 170 of the clamping members 60.

Referring now to FIG. 9, system 10 can isolate an end portion 14 of tubing section 12 from the tensive and compressive loads contained within tubing section 12 on the constrained side 174 of clamping member 100. In this embodiment, clamping member 100 is attached to support structure 19, configured as support tray 20, and anchors end portion 14 of tubing 12 to support structure 19. Anchoring end portion 14 causes it to be fixed relative to the support structure 19. Consequently, the loads that develop on the constrained side 174 of clamping member 100 are prevented from disturbing the end portion 14 of tubing 12. As a result, components such as fittings or equipment that attaches to end portion 14 are also isolated from the loads contained within tubing 12 on the constrained side 174 of clamping member 100.

System 10 is appropriate for a vertical, horizontal or angled tubing 12 runs. Installation of the device 10 is straight forward: (1) the length, layout and diameter of the tubing 12 run is determined; (2) the appropriate lengths and numbers of modular support trays 20 are selected as are the appropriate numbers and shapes (e.g. straight, tee, or elbow) of module connector portions 40 according to the tubing 12 run; (3) the modular support trays 20 may then be either: (a) connected by the module connector portions 40 and positioned; or (b) positioned first and then connected by the module connector portions 40; (4) the flexible tubing 12 is run through the open top channel 33 of the modular support tray 20; and (5) the flexible tubing is clamped at its first and second ends 14, 16 by the clamping member 60, any length of tubing may be existent between the first and second ends 14, 16. The above steps may be performed in any order. The tubing 12, or piping, is connected to other tubing lengths or machine parts via various tube fittings. Positioning of the modular support trays 20 refers to the fact that the modular support trays may be fastened to a wall or surface by various fastening means such as bolts, anchors, clamps, hangar supports, brackets, wire, adhesive or any other suitable means.

Note that in a horizontal tubing run the modular support tray 20 provides the benefit of actually supporting the weight of the fluid filled tubing 12 in addition to the constrainment of snaking and tube expansion. In a vertical tubing run, the modular support 20 provides a surface against which the tubing 12 may rest in addition to the constrainment of snaking and tube expansion. The weight of the fluid filled tubing may be, in part, supported by the clamping member 60 of the device 10. In an angled tubing run, the constrainment of snaking and tube expansion is present, further the modular support tray 20 may or may not function to support the weight of the fluid filled tubing depending on the angle of incline.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A system for constraining a section of flexible tubing and isolating compressive and tensive forces created in the tubing when the tubing expands and contracts, the system comprising:

a) a section of flexible tubing being formed of plastic, the tubing section having a fluid flow concourse for conveying fluid which varies in temperature, a pair of ends, a center portion between the ends, an exterior surface, and a length which expands and contracts in response to the fluid temperature;

b) a support tray for supporting the section of tubing, the support tray comprising a bottom portion, and a pair of side containment portions engaged with the bottom portion; and c) first and second clamping portions attached to the support tray; each clamping portion having a clamp locking portion and a tubing engagement portion for gripping the exterior surface of the tubing section; the clamping members further having an open position where the tubing engagement portions are spaced apart allowing for the insertion and removal of the tubing, and a closed position where the clamp locking portion locks the tubing engagement portions against the exterior surface of the tubing section thereby anchoring the tubing section to the support tray, preventing the lateral and longitudinal movement of the ends, and fixing the positions of the ends relative to each other, whereby when the length of the tubing expands compressive forces are exerted on the clamping members and the tubing snakes between the side constrainment portions, and when the length of tubing contracts tensive forces are exerted on the clamping members.

2. A system for constraining a section of flexible tubing and isolating compressive and tensive forces created in the tubing when the tubing expands and contracts, the system comprising:

a) a section of flexible tubing being formed of plastic, the tubing section having a fluid flow concourse for conveying fluid which varies in temperature, a pair of ends, a center portion between the ends, and a length which expands and contracts in response to the fluid temperature;

b) a support tray for supporting the section of tubing, the support tray comprising a bottom portion, and a pair of side containment portions engaged with the bottom portion; and c) a pair of clamping members attached to the support tray, each clamping member anchoring one of the ends of the tubing section thereby preventing the lateral and longitudinal movement of the ends and fixing the positions of the ends relative to each other, whereby when the length of the tubing expands compressive forces are exerted on the clamping members and the tubing snakes between the side constrainment portions forming nodes, the number of nodes dependent upon the amount the length of the tubing has expanded, and when the length of tubing contracts tensive forces are exerted on the clamping members, and wherein the side constrainment portions further comprise a top edge and a top constrainment portion adjacent the top edge, whereby the top constrainment portions constrain the snaking of the tubing to a horizontal plane.

3. A system for isolating a tubing junction from tensive and compressive loads, the system comprising:

a) two sections of flexible tubing, each tubing section having a junction end subjected to varying tensive and compressive loads; the junction ends of the tubing sections joined at the tubing junction;

b) a support structure positioned proximate the tubing junction; and c) first and second clamping members connected to the support structure, the first clamping member anchoring the junction end of one of the tubing sections to the support structure and the second clamping member anchoring the junction end of the other tubing section to the support structure, thereby fixing the positions of the junction ends relative to each other and the support structure, whereby the tubing junction is isolated from the varying tensive and compressive loads.

4. The system of claim 3, wherein the support structure comprises a pair of support trays positioned in fixed relation to each other, each support tray configured to support one of the tubing sections.

5. The system of claim 3, wherein the support structure spans the tubing junction.

6. A method for constraining a section of flexible tubing and isolating compressive and tensive forces created in the tubing when the tubing expands and contracts, the method comprising the steps of:

a) providing a section of flexible tubing being formed of plastic, the tubing section having an exterior surface, a fluid flow concourse for conveying fluid which varies in temperature, a pair of ends, a center portion between the ends, and a length which expands and contracts in response to the fluid temperature;

b) providing a support tray for supporting the section of tubing, the support tray having a bottom portion, and a pair of side constrainment portions engaged with the bottom portion;

c) attaching a pair of clamping members to the support tray; and d) anchoring each of the ends of the tubing section with one of the clamping members thereby preventing the lateral and longitudinal movement of the ends and fixing the positions of the ends relative to each other, whereby when the length of the tubing expands compressive forces are exerted on the clamping members and the tubing is forced to snake between the side constrainment portions, and when the length of tubing contracts tensive forces are exerted on the clamping members and wherein each clamping member comprises: first and second clamping portions attached to the support tray; each clamping portion having a clamp locking portion and a tubing engagement portion for gripping the exterior surface of the tubing section; the clamping members further having an open position where the tubing engagement portions are spaced apart allowing for the insertion and removal of the tubing, and a closed position where the clamp locking portion locks the tubing engagement portions against the exterior surface of the tubing section thereby anchoring the tubing section to the support tray.

7. A system for isolating an end portion of a section of flexible tubing from tensive and compressive loads existing within the tubing section, the system comprising:

a) a section of flexible tubing having an end portion, the tubing section subjected to varying tensive and compressive loads due to the expansion and contraction of the tubing section;

b) a support structure positioned proximate the end portion of the tubing section; and c) a clamping member attached to the support structure, the clamping member anchoring the tubing section proximate the end portion to the support structure thereby fixing the end portion with respect to the support structure, whereby the end portion is isolated from the varying tensive and compressive loads.

8. The system of claim 7, wherein the support structure comprises a support tray configured to support the tubing section, the support tray having a bottom portion and a pair of side constrainment portions engaged with the bottom portion.

9. The system of claim 7, wherein the tubing section has an exterior surface and the clamping member comprises: first and second clamping portions attached to the support structure; each clamping portion having a locking portion and a tubing engagement portion for gripping the exterior surface of the tubing section; the clamping member further having an open position where the tubing engagement portions are spaced apart allowing for the insertion and removal of the tubing, and a closed position where the clamp locking portion locks the tubing engagement portions against the exterior surface of the tubing section thereby anchoring the tubing section to the support structure.

10. The system of claim 9, wherein the tubing engagement portions further comprise an elastomer material for gripping the exterior surface of the tubing.

11. The system of claim 7, wherein the end portion of the tubing section connects to another tubing section.

12. The system of claim 7, wherein the end portion of the tubing section connects to equipment.

13. A method for isolating an end portion of a section of flexible tubing from tensive and compressive stresses existing within the tubing section, the method comprising the steps of:
   a) providing a tubing section having an end portion and an exterior surface, the tubing section subjected to varying tensive and compressive stresses due to the expansion and contraction of the tubing section;
   b) providing a support structure proximate the end portion of the tubing section;
   c) attaching a clamping member to the support structure proximate the end portion of the tubing section; and
   d) anchoring the tubing section adjacent the end portion to the support structure with the clamping member, thereby fixing the position of the end portion with respect to the support structure and isolating the end portion from the varying tensive and compressive stresses.

14. The method of claim 13, wherein the clamping member comprises: first and second clamping portions attached to the support structure; each clamping portion having a locking portion and a tubing engagement portion for gripping the exterior surface of the tubing section; the clamping member further having an open position where the tubing engagement portions are spaced apart allowing for the insertion and removal of the tubing, and a closed position where the clamp locking portion locks the tubing engagement portions against the exterior surface of the tubing section thereby anchoring the tubing section to the support structure.

15. A method for isolating a tubing junction from tensive and compressive stresses, the method comprising the steps of:
   a) providing first and second sections of flexible tubing, each tubing section having a junction end subjected to varying tensive and compressive loads; the junction ends of the tubing sections joined at the tubing junction;
   b) providing a support structure positioned proximate the tubing junction;
   c) attaching first and second clamping members to the support structure proximate the tubing junction;
   d) anchoring the junction end of the first tubing section with the first clamping member, thereby fixing its position relative to the support structure; and
   e) anchoring the junction end of the second tubing section with the second clamping member, thereby fixing its position relative to the support structure and the junction end of the first tubing section; whereby the tubing junction is isolated from the varying tensive and compressive loads of the tubing sections.

16. The method of claim 15, wherein the support structure comprises a pair of support trays positioned in fixed relation to each other, each support tray configured to support one of the tubing sections.

17. The method of claim 15, wherein the support structure spans the tubing junction.

* * * * *